March 9, 1937.  W. L. MORRISON  2,073,581
VEHICLE
Filed May 15, 1936  2 Sheets-Sheet 1
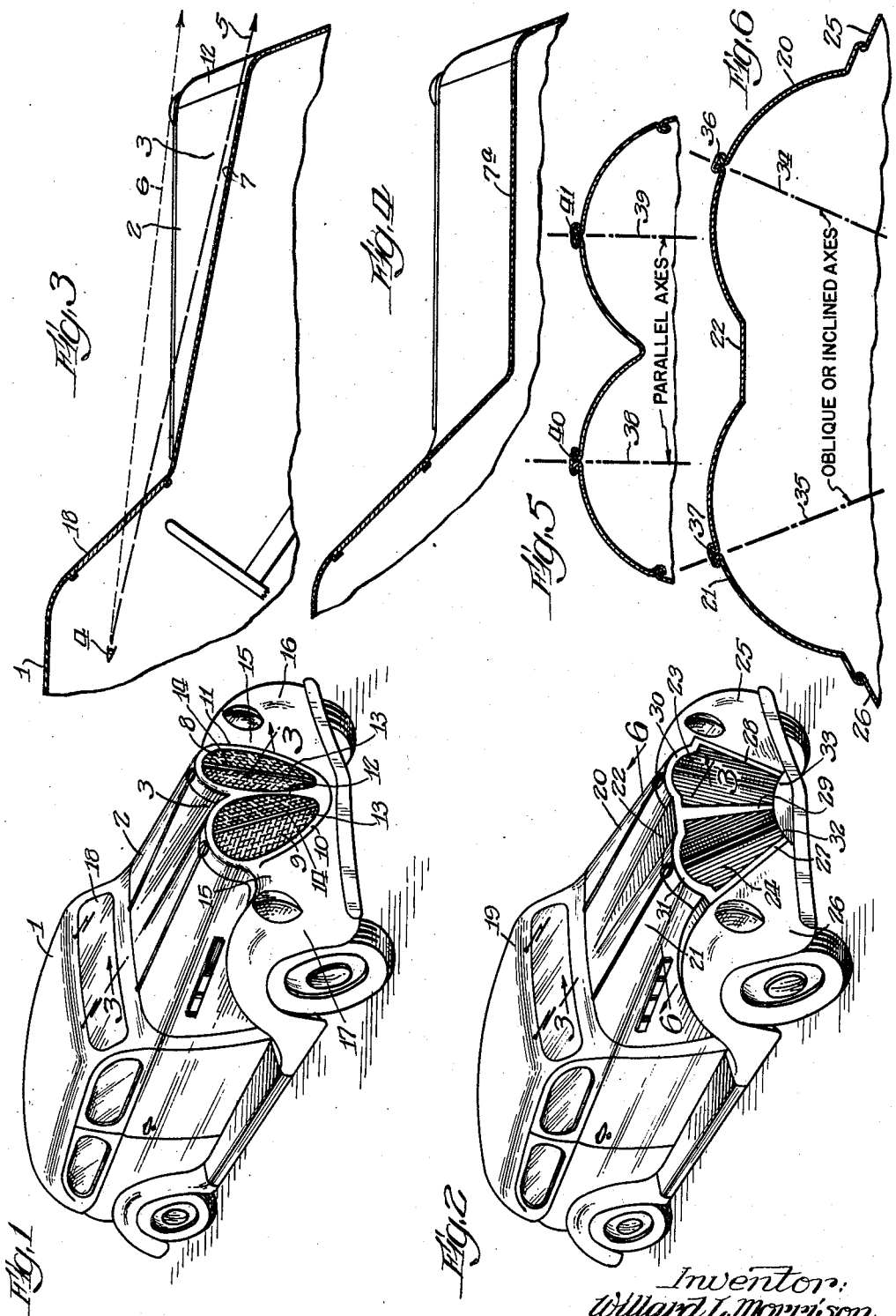

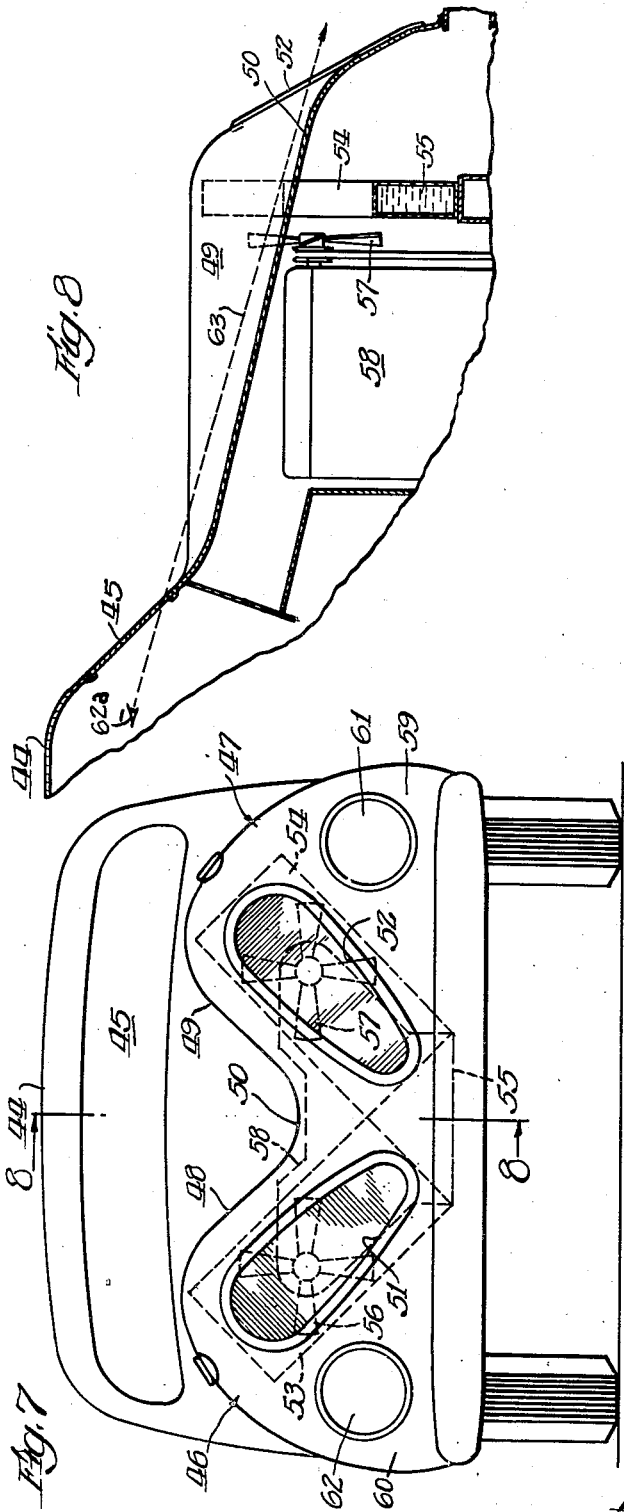

Patented Mar. 9, 1937

2,073,581

UNITED STATES PATENT OFFICE 2,073,581

VEHICLE

Willard L. Morrison, Lake Forest, Ill.

Application May 15, 1936, Serial No. 79,893

10 Claims. (Cl. 180—69)

This invention relates to vehicles and has for its object to provide a new and improved device of this description. The invention has as a further object to provide a vehicle of the motor type having a hood arranged so as to give the driver a better view of the road just ahead of the vehicle.

The invention has as a further object to provide a vehicle of the motor type having a hood with a front end which fills the space between the fenders. The invention has as a further object to provide a vehicle of motor type having a hood with two openings at the front thereof, placed side by side, for admitting air to the radiator. The invention has as a further object to provide a vehicle of the motor type having a hood at the front end which joins the fenders so as to provide an efficient stream line effect. The invention has as a further object to provide a vehicle of the motor type having a hood with twin openings at the front converging toward the bottom of the vehicle. The invention has other objects which are more particularly pointed out in the accompanying description.

Referring now to the drawings, Fig. 1 is a perspective view of one form of vehicle embodying the invention;

Fig. 2 is a perspective view of a vehicle showing a modified form of the invention;

Fig. 3 is an enlarged sectional view taken on line 3—3 of Fig. 1;

Fig. 4 is a view similar to Fig. 3 showing a modified construction;

Fig. 5 is an enlarged sectional view showing a modified construction;

Fig. 6 is an enlarged sectional view taken on line 6—6 of Fig. 2;

Fig. 7 is a view showing a modified construction and Fig. 8 is a sectional view taken on line 8—8 of Fig. 7.

Like numerals refer to like parts throughout the several figures.

Referring now to the drawings, I have illustrated in Fig. 1 one form of vehicle 1 embodying the invention. The tendency in motor vehicles at the present time is toward large hoods as this gives the appearance of a large powerful car. Such large hoods not only obstruct the view directly in front of the vehicle, but in many cases detract from the appearance of the vehicle to such an extent as to make it objectionable to users. It often happens that small people, particularly women, have their eyes so low down that they have difficulty in seeing over the hood, the line of sight only striking the road at a considerable distance ahead of the vehicle. I have arranged in the present device to provide a large hood which shall be free from these various objections.

The vehicle shown in Fig. 1 is provided with a hood 2 which covers the engine and the radiator, having at the middle portion thereof a depression or groove 3 which is of considerable depth, particularly at the front end of the hood. This permits the driver, whose eye is shown at 4, to look over the hood as it were, and see the road in close proximity to the vehicle. This is indicated in Fig. 3 by the line 5 which is the line of sight of the driver and it will be seen that it is striking the road much nearer the vehicle than the line of sight if it had to extend over the top of the hood as the vehicles are now made, such line of sight being indicated by the line 6. By permitting the driver to see the roadway near the front end of the car, the safety of the driving is increased.

In Fig. 3 I have shown the bottom 7 of the groove as inclined, but it may be arranged as shown in Fig. 4 where the bottom 7a is shown substantially parallel to the top of the hood, or it may be inclined to any intermediate position. At the front of the hood I provide two openings 8 and 9, one on each side of the groove 3. These openings may be of any desired size or shape. Each of these openings is preferably provided with bounding members 10 and 11. These openings may have separate bounding members at their adjacent edges or they may be provided with a common bounding member 12. These openings may be arranged in any desired manner. I have illustrated them in Fig. 1 as being inclined and converging toward the bottom of the vehicle and they may have any suitable grille 13 over the front thereof, the grille being preferably provided with a center member 14, although this may be omitted if desired. The front end 15 of the hood fills the space between the fenders 16 and 17, thus making the front end of the vehicle large, the front end extending laterally beyond the walls of the body of the car as indicated. The windshield 18 is inclined rearwardly from the bottom toward the top to increase the streamline effect. In Fig. 1 I have shown the openings 8 and 9 as having curved bounding lines and being of more or less oval shape.

In Fig. 2 I have illustrated a modified construction. In this construction the vehicle is provided with a body 19 having a hood with the two sections 20 and 21, there being a flattened portion 22 between them. This breaks up the contour of the hood and also gives a closer view of the road. In this construction there are two openings 23 and 24 at the front of the hood. These openings may be of any desired shape and size. The front end of the hood fills the space up to the fenders 25 and 26 so as to secure the proper streamline effect. In this construction the openings 23 and 24 have at their sides, straight bounding members 27, 28 and 29, with the curved bounding members 30 and 31 at the top and the curved bounding members 32 and 33 at the bottom. These openings may be provided with any suitable grille construction. It will be noted that these openings are inclined and have an inclined central axis, as shown by the lines 34 and 35. This inclined construction gives a better appearance to the car. Instead of having the openings inclined, they may be vertical and have parallel axes 38 and 39, as shown in Fig. 5. The hoods may be provided with the usual hinges 36, 37, 40 and 41.

The depth of the groove in the hood will of course depend upon the conditions presented. In a case, for example, where the engine under the hood is a V-engine the groove can be deeper than with engines of other types. This construction gives the appearance of having two engines and thus increases the appearance of size and power and the attractiveness of the car to the user.

In Figs. 7 and 8 I have shown a construction by means of which a deeper groove can be secured. In this construction I have illustrated a vehicle 44 having a windshield 45 and having, as it were, two hood sections 46 and 47 which have the opposed walls 48 and 49 forming a groove or depression near the middle of the front end of the vehicle for the line of sight of the driver, the bottom of the depression or groove being indicated at 50. These hood sections cover the two sets of engine cylinders. There is an air admission opening 51 at the front end of the section 46 and an air admission opening 52 at the front of the section 47 through which air is admitted. The radiator is preferably provided with two sections 53 and 54 which have the common water chamber 55 at the bottom, the air passing through the openings 51 and 52 going through these sections of the radiator. I also preferably provide two fans 56 and 57. The engine block is indicated at 58. The front of the car is, as it were, continuous, the portions 59 and 60 extending from the openings 51 and 52 to a point beyond the wheels and forming the fender for the wheels. The lights 61 and 62 are located in these portions. The eye of the driver is indicated at 62a and the line of sight is indicated at 63.

Heretofore there has been space between the hood and the fender for the driver's line of sight so that he could see the road close to the vehicle. With the present device this space is filled in but there is still provided means for the driver to see the road near the vehicle and that means is provided by having the two air admission openings at the front of the vehicle spaced apart at the top to provide road vision for the driver between them, the line of sight of the driver thus being below the tops of these air admission openings.

I claim:

1. A vehicle comprising a hood, said hood having a longitudinal groove along the top middle portion thereof for the line of sight of the driver, whereby the driver is able to see the road near the front of the vehicle.

2. A vehicle comprising a hood, said hood having a longitudinal groove along the top middle portion thereof for the line of sight of the driver, said vehicle being provided at the front end thereof with two air admission openings placed side by side.

3. A vehicle comprising a hood, said hood having a longitudinal groove along the top middle portion thereof for the line of sight of the driver, said vehicle being provided at the front end thereof with two air admission openings placed side by side, said openings being provided with bounding members, the bounding member at the adjacent edges of the openings being a common bounding member.

4. A vehicle comprising a hood, said hood having a groove along the top middle portion thereof for the line of sight of the driver, said vehicle being provided at the front end thereof with two air admission openings placed side by side, said openings converging from the top toward the bottom.

5. A vehicle comprising a hood, said hood having a groove along the top middle portion thereof for the line of sight of the driver, said vehicle being provided at the front end thereof with two air admission openings placed side by side, said openings being inclined with relation to each other.

6. A vehicle comprising an engine, a radiator, a hood for the engine, said hood having a groove extending longitudinally along the top middle portion thereof and forming the hood at the front end thereof into two sections, and a separate opening in the front of the vehicle, opposite each section, through which air is admitted to the radiator.

7. A vehicle comprising an engine, a radiator, a hood for the engine, said hood having a groove extending longitudinally along the top middle portion thereof and forming the hood at the front end thereof into two sections, and a separate opening in the front of the vehicle, opposite each section, through which air is admitted to the radiator, said opening decreasing in width from the top to the bottom thereof.

8. A vehicle comprising an engine, a hood therefor covering said engine, said vehicle being provided at the front end thereof with two air admission openings for admitting cooling air to said engine, spaced apart at the top, to provide road vision for the driver between them.

9. A vehicle comprising an engine, a hood therefor, said vehicle being provided at the front end thereof with two air admission openings spaced apart at the top, to provide road vision for the driver between them, the air admission openings being joined at their outer boundaries with the fenders so as to provide a continuous member extending from the outer edges of the fenders to the outer boundaries of said openings.

10. A vehicle comprising an engine, a hood therefor, front wheels, fenders for the front wheels, said vehicle being provided at the front end thereof with two air admission openings spaced apart at the top, to provide road vision for the driver between them, the air admission openings being joined at their outer boundaries with the fenders so as to provide a continuous member extending from the outer edges of the fenders to the outer boundaries of said openings.

WILLARD L. MORRISON.